(No Model.)
F. JENSEN.
BICYCLE.
No. 557,130. Patented Mar. 31, 1896.
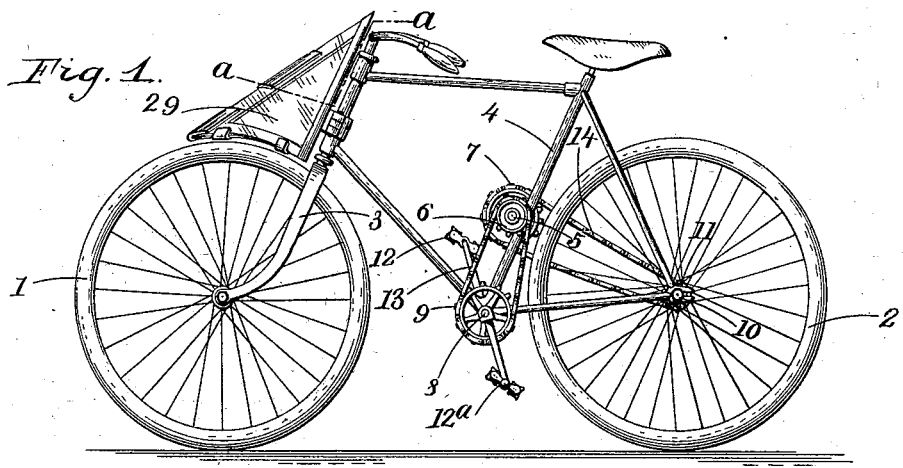
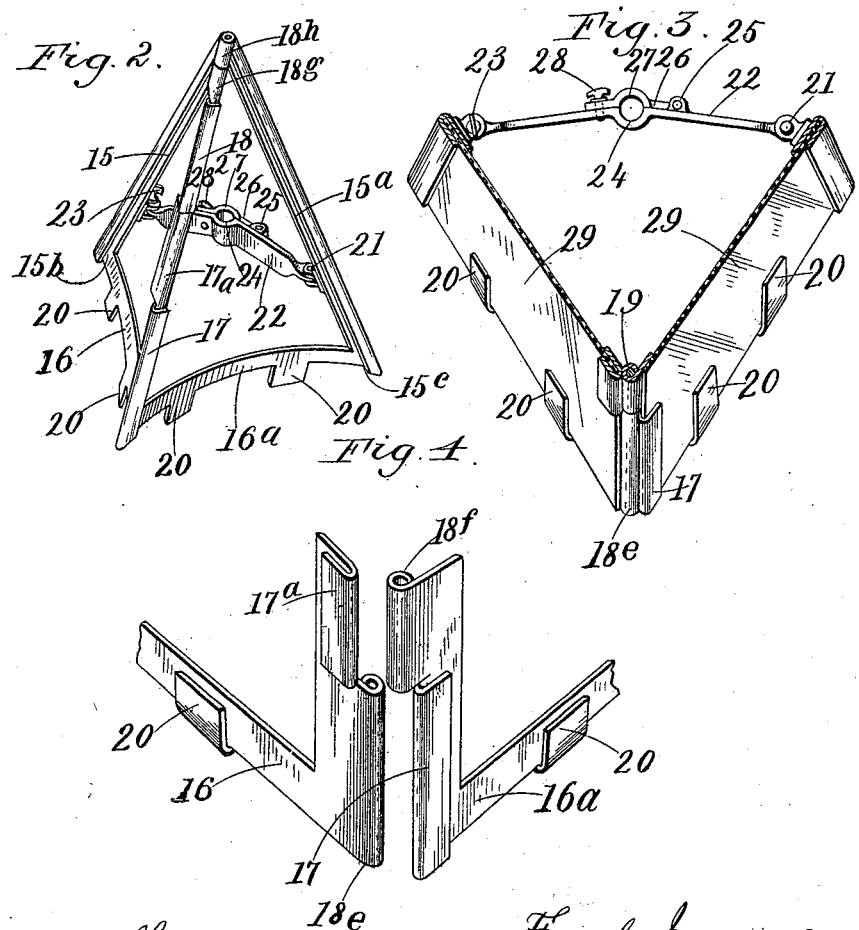
Witnesses,
John F. Sell.
Philip Brumberg.
Frank Jensen, Inventor.
By James Sangster, Attorney.

UNITED STATES PATENT OFFICE.

FRANK JENSEN, OF BUFFALO, NEW YORK.

BICYCLE.

SPECIFICATION forming part of Letters Patent No. 557,130, dated March 31, 1896.

Application filed November 25, 1895. Serial No. 570,049. (No model.)

*To all whom it may concern:*

Be it known that I, FRANK JENSEN, a citizen of the United States, residing at Buffalo, in the county of Erie and State of New York, have invented certain new and useful Improvements in Bicycles, of which the following is a specification.

My invention relates to an improved device whereby a bicycle may be passed with less force through the air, and to certain details of construction, all of which will be fully and clearly hereinafter described and claimed, reference being had to the accompanying drawings, in which—

Figure 1 represents a side elevation of a bicycle, showing my improved device connected therewith. Fig. 2 represents a detached perspective view of the framework of the device. Fig. 3 represents a horizontal section through the device on or about line $a\,a$, Fig. 1. Fig. 4 represents an enlarged view of two portions of the front hinged parts separated.

The object of my invention is to provide a light portable device that can be quickly opened out and secured to a bicycle-fork frame, so as and to present a sharp front edge with inclined sides adapted to cut easily through the air, and so that when not required for use it can be easily removed from the bicycle and folded together in a small compass and secured to any convenient part of the frame of the bicycle.

Referring to the drawings in detail, in Fig. 1 I have shown an ordinary bicycle, 1 and 2 representing the front and rear wheels, 3 the bicycle-fork. The frame and its several parts are all of the ordinary construction.

To the seat-post frame-piece 4 is secured, by brazing or in any well-known way, a box in which is mounted a shaft 5, having on one side of the box a small sprocket-wheel 6, and on the opposite side a larger sprocket-wheel 7. At the lower end of the frame (see Fig. 1) are the usual ball-bearings, in which is mounted the crank-shaft 8, having a sprocket-wheel 9 rigidly secured to it, and on the rear wheel-shaft 10 is rigidly secured a small sprocket-wheel 11. 12 and $12^a$ represent the two pedals. They are made in the usual way and are well known.

A sprocket-chain 13 connects the large sprocket-wheel 9 with the small sprocket-wheel 6, and the chain 14 connects the large sprocket-wheel 7 with the small sprocket-wheel 11, thereby multiplying the speed of the wheel 2 in accordance with the variations in the sizes of the driving and driven sprocket-wheels.

At the front of the bicycle is a removable portion having a wedge-shaped front cutting edge adapted to cut through the air easily. It consists of two triangular frame-pieces 15 $15^a$ 16 $16^a$ and slideway front portions 17, $17^a$ and 18. (See Fig. 2, also Figs. 3 and 4.) It is also provided with hinge portions $18^e$ and $18^f$, which are pivoted together by a pintle 19. (See Fig. 3, where a portion of this pintle is shown in section.) The upper portions are also provided with hinge portions $18^g$ and $18^h$, through which the pintle 19 passes. (See Fig. 2.) The lower sides of the bars 16 and $16^a$ are provided with portions 20, (see Fig. 2,) which are adapted to be bent upward to form slideways, as shown in Figs. 3 and 4, the object of which will appear farther on. At the rear is pivoted to the bar $15^a$, by a pin 21, one end of a cross-bar 22, having its opposite end removably secured by a thumb-screw 23. In or near the center of the bar 22 is a half-round depression 24, and to one side of the depression 24 is pivoted, by a pin 25, a short bar 26, having a corresponding depression 27. At the opposite end of the bar 26 is a set-screw 28 for rigidly securing it.

From the above description it will be seen that the triangular frame portion can be readily and rigidly secured to the bicycle-fork post by loosening the set-screw 28, then opening the bar 26, and putting it on the fork-post and rigidly clamping it thereto by closing the bar 26 and securing it by means of the thumb-screw 28. It is also capable of being adjusted up or down on said fork-post. (See Fig. 1, where it is shown secured to the fork-post in its lowest position.) In each side of this frame portion is secured a sheet of mica 29, or other transparent material, which is passed up in the slideway-grooves $15^b$ and $15^c$ in the bars 15 and $15^a$, (see Fig. 2,) also in the slideways 17, $17^a$ and 18. The portions 20 are then bent up over the under side of the mica so as to clamp and secure it substantially as shown in Fig. 3. Instead of the mica, glass may be used. The object in having a transparent material is to enable the rider to see clearly before him when the device is elevated to its highest point, but if desired any light material may be used in place of a transparent material.

When the device is not required for use, it is removed from the bicycle, and the thumb-screw 23 being loosened so as to permit the removal of the end of the bar 22, so that it can be turned inward toward the front, the two sides are then folded together, forming a small package that can be tied up and secured to any convenient part of the bicycle-frame.

I claim as my invention—

The combination with a bicycle, of a wedge-shaped device consisting of two side pieces pivoted together at the front edge, a cross-bar pivoted to one side at the rear and carrying means for adjustably securing it to a bicycle-fork post and means at its free end for securing the two sides when opened for use, the sides and cross-bar being adapted to fold together in a small compass when not required for use, substantially as described.

FRANK JENSEN.

Witnesses:
JAMES SANGSTER,
PHILIP BRUMBERG.